United States Patent Office 3,298,913
Patented Jan. 17, 1967

3,298,913
TREATING THE BARK OF TREES TO PREVENT
INSECT DAMAGE BY TREE BARK BEETLES
AND INSECTS
Katherine F. Stewart, New Orleans, La., assignor to
Stewart Operations, Inc., Kenner, La., a corporation
of Louisiana
No Drawing. Filed Sept. 1, 1965, Ser. No. 484,468
9 Claims. (Cl. 167—42)

The present invention relates to the application of pesticides to trees and more particularly to a liquid carrier for insecticides which increases its penetration and retention in tree bark.

The invention and its objects can best be understood by first considering the nature of insect attacks on the bark of trees. Infestations of various species of bark beetles have been a serious menace to forests and shade trees in the United States and in foreign countries for many years. These beetles live in the bark of trees. They bore tunnels through the outer bark into the living inner bark. Eggs are laid in the tunnels and the larvae which hatch feed on the inner bark, damaging or destroying the trees as they grow into adult bettles which then attack other trees. In addition, the beetles may transmit diseases which also have been responsible for the loss of large numbers of trees. An example is Dutch elm disease which is transmitted by a species of bark beetle.

The severity of beetle attacks vary amongst the species of trees and depend to some extent on their health. For example, trees damaged by drought, fire or wind are more susceptible to attack. However, in spite of resistance characteristics of many trees, bark beetle damage has continued to be a continuous source of destruction of trees and there have been a number of forests in which bark beetle damage has reached disastrous proportions.

The effect of various destructive agents is expressed in terms of mortality and growth loss.[1] In 1952, in the United States, in terms of sawtimber, insects outranked disease by a ratio of 2 to 1 and fire by 7 to 1 as a cause of mortality. Bark beetles were responsible for 90 percent of the insect caused mortality. Considered from the standpoint of growth impact, insect damage was less dramatic principally because bark beetles usually cause the death of trees; in 1952, 84% of bark beetle damage was mortality.

One area where beetle damage has been severe is in the southern states where the active beetle species are the southern pine beetle (*Dendroctonus frontales*), the black turpentine beetle (*Dendroctonus terebrans*) and the Ips Engraver Beetle. In 1952, in the southern states (North Carolina, South Carolina, Virginia, Alabama, Florida, Georgia, Mississippi, Tennessee, Arkansas, Louisiana, Oklahoma (east) and Texas (east)) beetles caused mortality of 86 million cu. ft. of growing stock and 334 million board feet of sawtimber. To this is added growth loss of 15 million cu. ft. of growing stock and 101 million board feet of sawtimber. This injury, although fluctuating in amount, continues year after year.

There have been other dramatic epidemics of bark beetle activity, one of which took place in a forest in Colorado and was described as follows in the 1949 Year Book of Agriculture:

"Ten years or so ago the Engelmann spruce forests in the higher Rocky Mountains of Colorado were a sight to behold. They were a reservoir of unexploited virgin timber, the summer homes and playgrounds of thousands of people who love the mountains. Tall, green, silent, majectic, these forests were a gift of God, an important asset to our natural wealth and welfare.

[1] The terms used herein are defined in "Timber Resources for America's Future" (1958), pages 629–637.

"Today, on much of that ground stand millions of dead trees—graceless, lifeless, valueless. They will stand there 20 years more, ghost forests and tragic evidence of how fast and silently a tiny insect can do its damage when once a combination of favorable factors brings about a sudden increase in its numbers.

"The insect is the Engelmann spruce beetle, the *Dendroctonous engelmanni* Hopk. Without the spectacular features of smoke or fire or explosion, but as devastatingly, the beetle built up its population, mostly in the inner bark of living trees, where it fed and bred. Those trees died; then new beetles emerged and attacked other trees. No person even suspected what was happening until the outbreak was well under way and approaching its peak. Then it was too late to do much. Between 1942 and 1948, 4 billion board feet of stumpage had been killed.

"Four billion board feet can furnish lumber for 400,000 five-room frame houses. The value in standing trees is estimated at 8 million dollars. It might someday have been made into products valued at 200 million dollars. The insects were more destructive than forest fires—in the 6 years, 16 times more timber was destroyed than was killed by fire in the past 30 years in the Rocky Mountain region."

There has been considerable study of techniques for controlling these beetles, both by killing beetles in infested trees and areas and steps to prevent their attack. In the preventative area, progress has been made through advanced forest management practices. For example, in the case of the western pine beetle and the Jeffrey pine beetle, in ponderosa pin stands, it has been demonstrated that cutting and removing trees with the highest beetle risk, usually from 15 to 25 percent of a stand, will effectively control the beetles for periods up to 15 years, even though neighboring stands remain infested. However, in large areas, this type of forest management has not been applied successfully.

Another preventative approach is employed in areas of logging operations. Beetles preferentially attack stumps and standing trees which have been damaged by heavy equipment. Therefore, selective spraying of insecticides on stumps and trees left standing is necessary to prevent a sudden increase in beetle population. Spraying of felled timber which is not removed quickly also is desirable.

Insecticides may be useful in controlling beetles by spraying infested trees. For example, it is considered dangerous to cut an infested tree, since, during transportation to a sawmill, the beetles in that tree may start an epidemic. Thus that tree might first be thoroughly sprayed to kill the beetles. Spraying also may be used on a large scale to control an epidemic.

Since the beetles attack tree bark almost exclusively, the insecticide must be applied to the bark. However, effective application of insecticides to a tree bark is difficult. The bark ordinarily has a hard outer layer which resists penetration of the chemical agent and a soft inner bark which contains living tissue and is the situs of the most serious bettle attack.

Unless care is exercised in formulating the carrying agent, having a quick penetrating action, a residual and life extending quality, the insecticide will be left on the outer bark to be washed away by the first rain.

The present invention provides an important advance in the application of insecticides to the bark of trees. The active chemical agent is made up in a dispersion in a multi-component residual, penetrating, carrying agent composition. This residual penetrating, carrying agent accelerates the rate of penetration of the active agent into tree bark and carries it away from the outer surface deep into the bark. As a result, the life of the insecticide is extended, so that it continues its action for extermination, whether by contact, fumigation or ingestion, over long life cycles of various insects. Due to the residual and penetration action of the carrying agent, rain, snow and other environmental agents cannot wash off the insecticide. In this manner, insecticides used with this invention can be used as a control of pests, as well as that of a remedial measure.

The composition preferably is in the form of a dilute solution of a concentrate. The concentrate contains a non-ionic surface active agent described further herein, an ionic surface active agent, namely sodium N-methyl-N-oleoyl taurate, a primary or secondary aliphatic alcohol, a polyfunctional alcohol, an inorganic chromate, and a monoether of a polyfunctional alcohol. These constituents cooperate to provide a stable solution which will not separate while stored at high or low temperatures. Therefore, it is possible to avoid transporting large quantities of water required for dilution purposes over long distances, the water being supplied from a local source.

The non-ionic surface active agent used is a condensate of ethylene oxide and tridecyl alcohol, i.e., having the formula $RO(CH_2CH_2O)_nCH_2CH_2OH$ where ROH is tridecyl alcohol. These condensates are available commercially with molecular weights of 332, 464, 596, 728 and 860. A condensate which has been found especially effective has the following characteristics:

| | |
|---|---|
| Flash point, °F. | 385 |
| Molecular weight | 596 |
| Viscosity, 210° F. centistokes | 8.0 |
| Density at 100° F. g./ml. | 0.9947 |
| Cloud point | [1] 61.9° C. |
| Surface tension | 26.7 |
| Interfacial tension 25° C. dynes 1 cm. 0.1% | 4.2 |
| Foam height mm. 40° C. (.10% aq. soln.): | |
| Initial | 118 |
| 5 minutes | 10 |
| Wetting time, tape test, 25° C., sec. 0.1% | 2.5 |
| Draves test, 3 g. hook, sec., 0.1% | 5.8 |

[1] In water.

Surprisingly, this wetting agent is far more efficient in penetrating than other non-ionic wetting agents, and, hence, it is far more effective in promoting penetration of bark. However, its effectiveness alone is not equivalent to the present composition.

The primary or secondary alcohols are lower saturated aliphatic alcohols, having up to about 4 carbon atoms, such as methyl alcohol, ethyl alcohol or isopropyl alcohol. Of these, methyl alcohol is preferred because of its low cost.

Ethyl alcohol can be used but is somewhat less satisfactory. Isopropyl alcohol is at least the equal of methanol. These primary or secondary alcohols decrease viscosity and increase surface tension somewhat, which increases the quality and stability of the formula.

Of the polyfunctional alcohols which can be used, ethylene glycol is preferred, although other alcohols such as propylene glycol, butylene glycol, trimethylene glycol, tetramethylene glycol and diethylene glycol are suitable. Ethylene glycol lowers the freezing point of the composition, and also increases the boiling point of the water phase, thus increasing the range of temperatures in which it can be used.

The inorganic chromate is added for the purpose of improving corrosion resistance to reduce attack on spray equipment and sodium chromate is preferred. Other alkali metal chromates and dichromates, such as potassium dichromate may be substituted.

As the anionic surfactant, sodium N-methyl-N-oleoyl taurate is used, which is available commercially; this stabilizes the concentrate and dilute solutions and increases solubility of the non-ionic surfactant. Consequently, layering out is minimized. Avoiding layering tion. Otherwise, one portion might contain too little of withdrawn from a container will have the same composition. Otherwise, one portion might contain too little of the active agents and another might contain too much. One type of commercial product which may be used contains about 14% or a little more by weight of sodium-N-methyl-N-oleoyl taurate, 78% water and 3–5% sodium chloride, in addition to minor amounts of other materials.[2] Other commercial products are available which contain generally larger amounts of the taurate, and these may be used. However, they are considered less satisfactory. One contains a particularly large amount of sodium chloride and for this reason it is preferably not used. When employing these other products, an adjustment must be made in the amount of water added to the concentrate to take into account the amount of water which they contain.

The monoether of a polyfunctional alcohol preferably has 3 to 6 carbon atoms and may be, e.g., the ethyl ether of ethylene glycol (cellosolve), methyl cellosolve, butyl cellosolve and carbitol. This increases the flash point and surface tension, improves high temperature stability, and helps in emulsification of non-aqueous liquids with water.

In the compositions to which the pesticide is added, the proportions of materials used are within the following ranges percentages being by weight.

| | |
|---|---|
| Non-ionic surface active agent | 20% to 40% |
| Anionic surface active agent | 0.25% to 50% |
| Primary or secondary aliphatic alcohols | 0.20% to 10% |
| Polyfunctional alcohols | 0.25% to 50% |
| Monoethers of polyfunctional alcohols | 0.02% to 10% |
| Inorganic chromates | 0.01% to 1% |
| Water | 10% to 99% |

The above concentrations can be made, as indicated above, by diluting a concentrate incorporating the above listed proportions or can be made directly from each ingredient. Proportions for this concentrate are about as follows:

| | |
|---|---|
| Non-ionic surface active agent | 25.0%–15% |
| Sodium-N-methyl-N-oleoyl taurate, about | 1–2% |
| Primary or secondary aliphatic alcohol | 2.5%–3% |
| Polyfunctional alcohols | 35.0%–30% |
| Monoether of polyfunctional alcohol | 3.0%–.04% |
| Inorganic chromates | 0.5%–.05% |
| Water | 25%–45% |

In selecting proportions, it is possible to vary somewhat the amounts of all constituents except the surface active agents. Thus, when using the non-ionic surface active agent described above, having a molecular weight of 596, and the anionic material which contains 14% taurate, it is desirable to use about twice as much of the nonionic as the anionic. Significant departures from this ratio lead to "layering out" and other types of premature separation. Similarly, when other forms of these materials are used, it is quite important to stay within the above ranges.

Within the above, preferred proportions and materials are:

| | |
|---|---|
| Non-ionic surface active agent, about | 20% |
| Sodium-N-methyl-N-oleoyl taurate | 1–1.5% |
| Methyl alcohol, about | 2.5–3% |
| Monoethyl ether of ethylene glycol | 2.5–3% |
| Ethylene glycol | 30–35% |
| Sodium chromate | 0.1–0.3% |
| Water | 30–40% |

The materials employed in the concentrate may be combined by any suitable means, but it has been found

[2] Including 1.5% sodium oleate.

particularly desirable to heat the concentrate to an elevated temperature in the range 150° F.–250° F., preferably 170–190° F. since this tends to homogenize the solution and minimize subsequent layering out.

The following examples illustrate the preparation of the wetting and penetrating agent. All parts are by weight.

EXAMPLE I

A concentrate was prepared containing the following materials, in parts by weight:

| | |
|---|---|
| Non-ionic surface active agent, M.W. 596 | 19.71 |
| Methyl alcohol | 2.35 |
| Cellosolve | 2.78 |
| Water | 33.5 |
| Ethylene glycol | 32.77 |
| Sodium chromate | .14 |
| Sodium-N-methyl-N-oleoyl taurate composition containing about 14% taurate | 8.91 |

These materials may be compounded by making two solutions as follows:

Solution A

| | |
|---|---|
| Non-ionic surfactant | 19.71 |
| Alcohol | 2.35 |
| Cellosolve | 2.78 |
| Water | 20.00 |
| Glycol | 32.77 |

Solution B

| | |
|---|---|
| Taurate | 8.91 |
| Water | 12.77 |
| Chromate | .14 |

Solution B can be prepared by gentle heating. The two solutions are mixed and heated up to 180° F. The mixture is then cooled. The heating step helps to keep the material clear, in the concentrate form and when diluted in solution, whether frozen or heated to temperatures as high as 180° F.

The concentrate can be diluted with water to make solutions containing e.g., 1–5%, preferably 1–2% concentrate. In almost all cases, 1% is a sufficient concentration, although 2% may be required for trees having thicker bark. Dilute solutions containing 1–5% of the concentrate such as that of Example I may be sold premade for example, in 5-gallon containers. Similarly, the equivalent of the diluted solution can be made up by adding the active constituents to water directly without first making the concentrate. That is, the diluted solutions used in spraying should contain about 1–5% of the concentrate in water or it should contain the same amounts of the active agents as a solution in water of 1–5% concentrate. However, the concentrate ordinarily is preferred since it avoids the cost to the purchaser of transporting water.

The invention is applicable to any insecticide which is effective against bark beetles and the bark penetrating insects. However, it is particularly useful with solid or liquid organic pesticides of the chlorinated hydrocarbon type such as the gamma isomer benzene hexachloride (BHC) and 1,1,1 - trichloro - 2,2 - bis-(p-chlorophenyl) ethane (DDT) which are solid and substantially insoluble in water. The insecticide should be in a form which is emulsifiable in water. These two insecticides have been used against bark beetles, and BHC is at present considered especially effective. The gamma isomer of BHC is available commercially in the relatively pure state and in mixture with other isomers. The pure material is preferred.

The amount of insecticide will of course vary depending on activity. However, concentrations of less than 5% by weight are ordinarily adequate. For example, very good results are achieved with BHC at a concentration of 1% by weight emulsified in a solution of 1–2% of the concentrate of Example I.

One technique for making up an emulsion for practicing the invention, especially useful in the case of a solid pesticide, is to first form a solution of the pesticide in an organic liquid, e.g., a water immiscible liquid, which is a solvent for it and then dispersing the resultant solution in water containing, e.g., 1–2% of the concentrate. Solutions of BHC in aliphatic or aromatic hydrocarbons such as xylene are available, sometimes referred to as liquid lindane. The resultant emulsion is then sprayed on the bark of trees or tree stumps as required. The wetting agent carries the insecticide deep into the bark where it cannot be removed by rainfall or abrasion. There it is in a position to kill bark beetles and remain active for long periods of time.

The emulsion may be applied to the tree bark by any means, spraying being preferred. Conventional high or low pressure sprayers are satisfactory. The concentrate has the advantages of being non-corrosive and not attaching packings of spray equipment making it adaptable to any type of equipment.

Other advantages of the present invention include its making possible the use of a water emulsion in spraying the bark in place of oil emulsions which have been used in the past. Benzene hexachloride has been employed in the defense against bark beetles previously by dispersing it in a petroleum fraction such as diesel oil. Such emulsions are particularly dangerous to forest workers since they are especially likely to penetrate through human skin. In addition, since sufficient insecticide normally is applied to run off slightly from the tree, a small amount of it will necessarily accumulate on the ground. Oily materials make the ground slippery and therefore hazardous, while the aqueous emulsions of the present invention penetrate and dry rapidly with a consequent reduction of this risk. Yet another advantage of water emulsions is they avoid the fire hazards associated with oil. It also is important that the present penetrating and residual agent is considerably less expensive than diesel oil. Cost is important in any large scale use in forests, and there is a savings of as much as 66% of the cost of carrier when the materials of this invention are used. In the case of BHC spraying, the saving permits use of the more pure grades, i.e., those containing more of the active gamma isomer, which is more effective but also more expensive.

The rapid peneration of the insecticide deep into the bark of trees is believed to be advantageous, also, as a protection for wild life, since brids which nest on the trees are much less likely to come into contact with the insecticide.

It will be understood that the process of the invention may be used and these advantages are achieved with all types of tree bark, and the bark or skin or shrubs. Therefore, the term "bark of trees" or "tree bark," as used herein includes all of these. Similarly, various insects can be controlled. Bark beetle attack on conifers such as pines is of such great economic importance, and the bark of these trees is so difficult to penetrate, that particular reference has been made to their treatment; no limitation thereto is intended.

The following example illustrates the use of the foregoing composition.

*Example II*

A solution was prepared containing one pound of the gamma isomer of benzene hexachloride per gallon xylene. That is, the solution contained about 11% of the gamma isomer, about 16% of other isomers and about 68% xylene. To one gallon of this solution, there was added to 25 gallons of a solution containing 1% of the concentrate of Example I in water. After stirring, the liquid was sprayed onto the bark of pine trees. It was found to penetrate rapidly into the bark. In comparison with the bark of similar trees on which had been applied an emulsion of benzene hexachloride in water, without the concentrate of Example I, it was found that the effectiveness against attack by bark beetles was prolonged considerably.

Various embodiments now have been described for purposes of illustrating the invention. However, no limitation thereto is intended since it will be appreciated that various changes may be made in the compositions and methods of using them without departing from the scope of the invention, as defined in the appended claims.

What is claimed is:

1. A method of treating the bark of trees to prevent insect damage which comprises applying to the bark a dispersion of an effective amount of an insecticide in an aqueous solution of a residual, carrying, penetrating agent which consists essentially of a condensate of ethylene oxide with tridecyl alcohol, sodium N-methyl-N-oleoyl taurate, a member of the group consisting of primary and secondary alcohols, a polyfunctional alcohol, a monoether of a polyfunctional alcohol and an inorganic chromate, the proportions of materials in the aqueous solution being the same as of a composition derived by mixing water with about 1–5% of a concentrate consisting essentially of 15–25% of said condensate of ethylene oxide with tridecyl alcohol, about 1–2% of sodium-N-methyl-N-oleoyl taurate, about 2.5–3% of said member of the group consisting of primary and secondary alcohols, about 30–35% of said polyfunctional alcohol, about 0.05–0.5% of said inorganic chromate, about 0.04–3% of said monoether of polyfunctional alcohol and about 25–45% water, all percentages being by weight.

2. A method of treating bark as set forth in claim 1 wherein said insecticide is insoluble in water.

3. A method of treating bark as set forth in claim 2 wherein said insecticide is a chlorinated hydrocarbon.

4. A method of treating bark as set forth in claim 3 wherein said insecticide is benezene hexachloride.

5. A method of treating bark as set forth in claim 4 in which the benezene hexachloride is dissolved in a water-immiscible organic solvent.

6. A method of treating bark as set forth in claim 3 wherein insecticide is 1,1,1-trichloro-2,2-bis-(p-chlorophenyl) ethane.

7. A method of treating bark as set forth in claim 1 wherein the amount of insecticide in said dispersion is up to 5% by weight.

8. A method of treating bark as set forth in claim 1 in which said concentrate consists essentially of about 20% of said condensate of ethylene oxide and tridecyl alcohol, 1–1.5% of sodium-N-methyl-N-oleoyl taurate, about 2.5–3% methyl alcohol, 2.5–3% of a monoether of ethylene glycol, 30–35% ethylene glycol, about 0.1–0.3% sodium chromate and 30–40% water.

9. A method of treating bark as set forth in claim 1 wherein the amount of said concentrate in said aqueous solution is 1–2%.

No references cited.

LEWIS GOTTS, *Primary Examiner.*

S. K. ROSE, *Assistant Examiner.*